(12) United States Patent
Lehle

(10) Patent No.: US 8,763,602 B2
(45) Date of Patent: Jul. 1, 2014

(54) DEVICE, IN PARTICULAR A HELIOSTAT OR PHOTOVOLTAIC DEVICE

(75) Inventor: Robert Lehle, Gärtringen (DE)

(73) Assignee: Lehle GmbH, Gärtringen (DE)

( * ) Notice: Subject to any disclaimer, the term of this patent is extended or adjusted under 35 U.S.C. 154(b) by 40 days.

(21) Appl. No.: 13/519,697

(22) PCT Filed: Dec. 28, 2010

(86) PCT No.: PCT/EP2010/070798
§ 371 (c)(1),
(2), (4) Date: Jun. 28, 2012

(87) PCT Pub. No.: WO2011/080270
PCT Pub. Date: Jul. 7, 2011

(65) Prior Publication Data
US 2012/0285511 A1 Nov. 15, 2012

(30) Foreign Application Priority Data
Dec. 28, 2009 (DE) ...................... 20 2009 017 658 U

(51) Int. Cl.
*F24J 2/38* (2014.01)

(52) U.S. Cl.
USPC ........................................ 126/605; 52/173.3

(58) Field of Classification Search
USPC ......... 126/244, 246, 259, 600, 604, 605, 606, 126/607, 621–623; 136/600, 604, 605, 606, 136/607, 244, 246, 259, 291, 251; 52/173.3; 257/433
See application file for complete search history.

(56) References Cited

U.S. PATENT DOCUMENTS 6,123,067 A 9/2000 Warrick
2003/0062037 A1 4/2003 Hayden
2006/0096586 A1 5/2006 Hayden

FOREIGN PATENT DOCUMENTS

| DE | 20 2007 008593 | 8/2007 |
|---|---|---|
| DE | 20 2007 012317 | 11/2007 |
| DE | 10 2006 036149 | 2/2008 |
| DE | 10 2006 040 962 | 3/2008 |
| EP | 2 071 254 | 6/2009 |
| EP | 2 072 933 | 6/2009 |
| EP | 2 119 940 | 11/2009 |
| JP | 2003-322418 | 11/2003 |
| WO | 2009/133750 | 11/2009 |

OTHER PUBLICATIONS

International Search Report for corresponding patent application No. PCT/EP2010/070798 dated Apr. 26, 2012.
German Search Report for corresponding patent application No. 20 2009 017 658.4 dated Jun. 29, 2012.

*Primary Examiner* — William Gilbert
(74) *Attorney, Agent, or Firm* — Renner, Otto, Boisselle & Sklar, LLP

(57) ABSTRACT

The invention relates to a device, in particular a heliostat or photovoltaic device, having a stand (12), having a carrier device (14) disposed thereon and mounted rotatably about an azimuth axis (36) on the stand (12) and comprising a rotary beam (18) on which a support frame (17) for receiving at least one reflector (16) or at least one photovoltaic module is pivotally disposed, so that the support frame (17) can pivot about an elevation axis (37), having a hydraulic drive controller (28) actuating at least one hydraulic lift cylinder (25, 26) for inducing the rotary motion about the azimuth axis (36) and at least one hydraulic lift cylinder (27) for inducing the pivot motion about the elevation axis (37), wherein at least one azimuth drive (34) comprising at least the one hydraulic lift cylinder (25, 26) actuating the rotary motion of the rotary beam (18) is disposed in the interior (44) of the rotary beam (18).

17 Claims, 5 Drawing Sheets

DEVICE, IN PARTICULAR A HELIOSTAT OR PHOTOVOLTAIC DEVICE

The invention relates to a device, in particular a heliostat for solar central receiver systems or a photovoltaic device, said device comprising a stand and a carrier device arranged thereon, said carrier device receiving at least one reflector or at least one photovoltaic module so that the position of reflector or of the photovoltaic module relative to the zenith angle of the sun can be changed.

Such a device is known from DE 20 2007 008 539 U1. A carrier device is arranged on a stand and is mounted rotatably about an azimuth axis on the stand and has a rotary beam, on which a support frame for receiving reflectors or photovoltaic modules is pivotally arranged so that the support frame is pivotable about an elevation axis and the carrier device can be changed according to the position of the zenith angle of the sun. A hydraulic drive unit is provided to control the carrier device and drives at least one hydraulic lifting cylinder to induce the rotary motion about an azimuth axis and drives at least one hydraulic lifting cylinder to induce a pivotal motion about an elevation axis. These hydraulic lifting cylinders are supplied with hydraulic fluid via a pump assembly, which is coupled to a hydraulic store, and are controlled by a hydraulic drive controller. The lifting cylinder designed to induce the rotary motion is fixed on the stand. Said lifting cylinder engages via a lifting rod with a pivoted lever, which is fixed to the rotary beam, to induce the rotary motion. Such a hydraulic lifting cylinder for the direct azimuth drive can reach an angle of rotation of at most 120°. Depending on the installation location, in particular in the region of the equator belt, it is necessary for the angle of rotation of the azimuth drive to enable a rotary motion up to 360°. In addition, the fundamental problem with such devices is that environmental influences, such as sun, rain, dust, and sand, place stress on the individual drives.

The object of the invention therefore is to create a device, in particular a heliostat or a photovoltaic device, in which at least one drive is protected against external environmental influences, and in which in particular an angle of rotation of the carrier device of greater than 120° is possible.

This object is achieved in accordance with the invention by the features of claim 1.

Due to the arrangement, inside the rotary beam, of an azimuth drive which has at least one hydraulic lifting cylinder controlling the rotary motion of the rotary beam, the advantage is provided that the hydraulic lifting cylinder is protected against influences from the sun, rain, and dust, in particular including desert sand, these influences having no effect on the hydraulic lifting cylinder, in particular the extendable and retractable piston rod and a seal surrounding the piston rod. Due to the arrangement of the at least one hydraulic lifting cylinder in the rotary beam, an encapsulated arrangement is created. Such a hydraulic lifting cylinder, which controls a rotary motion, which may be greater than 120°, by an extending and retracting motion of its piston rod, can be installed in the hollow space or in the interior of the rotary beam. The retention of the hydraulic control of the rotary motion of the carrier device about the azimuth axis further affords the advantage that precise and cost-effective control compared to conventional control methods via electric motors and transmissions having large transmission ratios, which are mechanically complex and expensive, is enabled.

In a further preferred embodiment of the device, the azimuth drive has a transmission, which is provided in the rotary region of the rotary beam relative to the stand and is covered or protected by the rotary beam. Not only is the transmission of the azimuth drive thus protected against external influences, but also the axis of rotation between the rotary beam and the stand, so that simpler bearing elements can be used for the rotatable mounting of the rotary beam on the stand structure. For example, due to the protected arrangement, a sliding bearing may suffice to receive the rotary beam or the carrier device relative to the stand.

In a further preferred embodiment of the invention, the hydraulic drive controller and/or the electric drive controller or an accumulator and/or a controller, which is already coupled to the accumulator for emergency power, and/or a pump assembly and/or a pump store is arranged in the rotary beam. Due to the very slow adjustment movements of the carrier devices about the azimuth axis, which for example lie in a range of less than 1°/min, in particular less than 0.5°/min, lightweight construction of the rotary beam is not necessary. Rather, the hollow space or interior provided in the rotary beam can be used to integrate therein individual or all components for driving and for controlling the device. This also affords the advantage that manipulations are impeded. This also makes it possible, for example, for feed lines to the stand to be laid in the ground so that they are guided within the stand to the individual drive components and control components in the rotary beam. A drive controller arranged externally on the stand or, where applicable, also hydraulic components positioned separately relative to the stand can thus be integrated in the rotary beam.

In accordance with a further preferred embodiment of the invention, the rotary beam is U-shaped or box-shaped and has at least one removable wall element. Simple assembly and fitting of the rotary beam with the individual components for driving and controlling the carrier device is thus enabled. In addition, easy accessibility during maintenance works is provided.

In a further preferred embodiment of the invention, the at least one hydraulic lifting cylinder controlling the elevation motion is arranged on the fixed housing or on the removable wall element of the housing. Simple connection and assembly can thus be enabled. At the same time, the hydraulic connectors can be guided inside the rotary beam via the removable wall element.

In a further preferred embodiment of the invention, the driving wheel has a hollow axis of rotation. Electrical and/or hydraulic connecting lines guided in the stand can thus be guided through the drive wheel arranged rigidly on the rotary beam, and a complete and integrated supply of the hydraulic electric drive controller can be created.

In accordance with a preferred embodiment of the invention, the pivot bearing is pre-assembled on the rotary beam and the pivot bearing in particular is biased without play for assembly on the stand. A complete functional unit can thus be formed, which consists at least of the rotary beam with a pivot bearing arranged thereon so that, even during assembly of the pivot bearing on the housing of the rotary beam at the site of manufacture, the pivot bearing can be adjusted without play. Such a fine adjustment or play-free adjustment on site is thus no longer necessary, thus reducing the assembly time considerably and resulting in greater accuracy when directing the reflectors.

Furthermore, the rotary beam can preferably be inserted into the stand together with the pre-assembled pivot bearing and can be fixed by at least one fastening element. This is an assembly process which is easy to carry out, that is to say, once the pivot bearing has been inserted into the stand or the pylon pipe, merely fastening screws or the like are to be tightened so as to complete and secure the assembly of the rotary beam relative to the stand.

In a further preferred embodiment of the invention, the rotary beam is arranged rotatably on the stand by means of a pivot bearing and the pivot bearing has a central passage for hydraulic and/or electric connecting lines. This means that it is possible to subsequently lay electric and/or hydraulic connecting lines inside and that the rotary beam or the carrier device can also be rotated by 360° in an unimpeded manner to move the reflectors or photovoltaic elements relative to the zenith angle of the sun. In particular, electric and/or hydraulic connecting lines can thus be laid in the ground and, at the location of the device, can be guided within the stand to the rotary beam. Increased safety requirements can thus be met.

In a preferred embodiment of the invention, the azimuth axis has two lifting cylinders arranged in the rotary beam, the extending motion induced by said cylinders of the piston rods being oriented identically, and a hydraulic lifting cylinder arranged to the left of the axis of rotation forming a front hydraulic lifting cylinder and a hydraulic lifting cylinder arranged to the right of the axis of rotation forming a rear lifting cylinder, and the ends of the piston rods of the hydraulic lifting cylinders being connected in each case to an end of a drive element, which engages with a driving wheel arranged rigidly on the rotary beam. This specific arrangement of the lifting cylinders in succession enables rotation of more than 120°, in particular up to 360°, due to the lifting stroke. The drive element is preferably designed as a drive chain, which engages with a driving wheel designed as a gearwheel. Alternatively, a rack or a drive belt or a toothed drive belt may also be used.

In accordance with a further preferred embodiment of the azimuth drive in the rotary beam, the front lifting cylinder operates in a pressing manner during the extending motion and pressure is applied to a piston area of the front lifting cylinder, and the rear lifting cylinder operates in a pulling manner and pressure is applied to a piston rod area of the rear lifting cylinder. This mode of operation, in which the lifting cylinders operate against one another to a certain extent, makes it possible for the drive element, which is formed in particular as a drive chain, to always be tensioned between the two lifting cylinders. A play-free driving motion of the carrier device is thus achieved, and therefore a precise rotary motion about the azimuth axis and precise positioning of the carrier device are enabled.

In a further preferred embodiment of the invention, the front and rear lifting cylinders are formed identically. Due to the structurally identical embodiment, a cost reduction can be achieved when producing this device. For example, in the case of large heliostat fields, up to a thousand heliostats are used, and therefore a cost reduction is achieved by structurally identical parts. Furthermore, this affords the advantage that, for example, with a driving motion, the piston of the front lifting cylinder is loaded by the pressure of the piston area, and the piston of the rear lifting cylinder is only pressurised via the piston rod area, that is to say by half the force of the front lifting cylinder. The drive element is thus automatically always tensioned, thus creating the play-free driving motion. In addition, the advantage is also afforded that, in case of any expansion of the drive element during the service life, compensation is provided without said expansion of the drive element having a detrimental effect on the precise control of the rotary motion.

Furthermore, guide rolls or deflection rolls are preferably provided beside the driving wheel. These rolls are used to loop the drive chain around the driving wheel, at least in part, and enable secure drive.

In a further preferred embodiment of the invention, the rotary beam with the azimuth drive consisting of two hydraulic lifting cylinders, a hydraulic drive controller, an electric drive controller, a transmission, and preferably the hydraulic lifting cylinder of the elevation drive are designed as a functional module and have pluggable electric and hydraulic connectors of the connecting lines. This arrangement of the rotary beam and of the electric and hydraulic components for the drive and controller of the carrier device about the azimuth axis and elevation axis affords the advantage that complete assembly and functional testing can be carried out at the site of manufacture. This functional module can be supplied as a unit to the installation location after functional testing and can be assembled once the stand has been positioned. Merely the plug connectors of the electric and hydraulic connecting lines still have to be connected. This reduces the assembly time considerably and increases reliability when starting up the device.

The invention and further advantageous embodiments and developments thereof will be described and explained in greater detail hereinafter on the basis of the examples illustrated in the drawings. The features to be inferred from the description and the drawings can be applied in accordance with the invention either individually or together in any combination. In the drawings.

Figure 1:
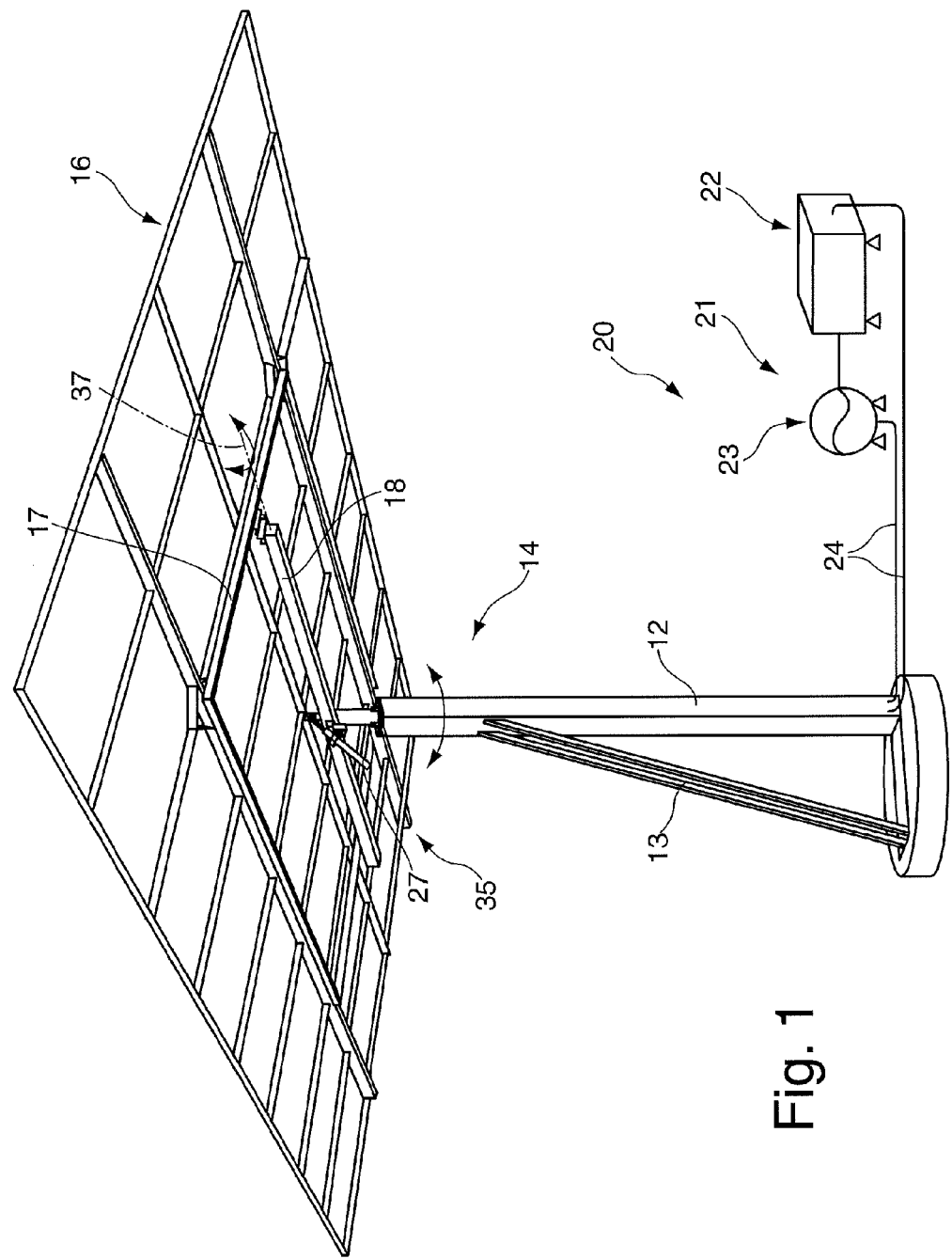
FIG. 1 shows a perspective view of a heliostat in an idle position.
Figure 2:
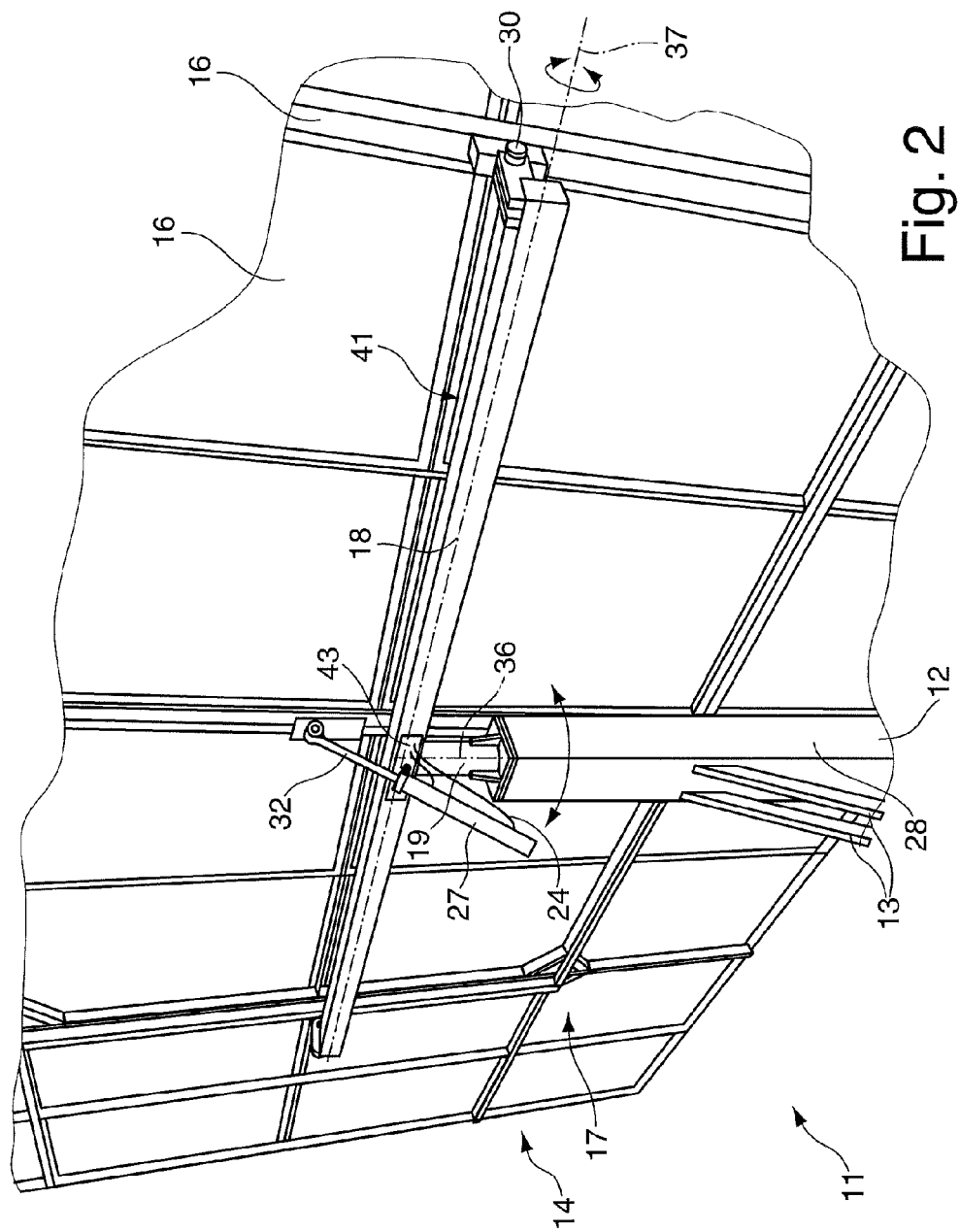
FIG. 2 shows a schematically enlarged view of a carrier device, in a working position, arranged on the heliostat.

A perspective view of a device 11 according to the invention in the form of a heliostat is illustrated in FIGS. 1 and 2. This device 11 comprises a stand 12, which can be reinforced by struts 13. A carrier device 14 is arranged at the upper end of the stand 12 and is provided to receive one or more reflectors 16 or photovoltaic modules. The carrier device 14 has a support frame 17, to which the reflector 16 is fastened. The support frame 17 is received pivotally about a pivot axis or elevation axis 37 by a rotary beam 18, which is in turn received rotatably about an axis of rotation or azimuth axis 36 by the stand 12 by means of a pivot bearing 19. Due to this arrangement, the reflector 16 is mounted biaxially so as to enable a reflection position of the incident light for focussing on an absorber (not illustrated in greater detail) in a solar central receiver system. An idle position of the carrier device 14 is illustrated in FIG. 1. FIG. 2 shows a working position of the carrier device, in which a reflected solar radiation is deflected onto the absorber (not illustrated in greater detail). If the carrier device 14 receives one or more photovoltaic modules instead of a reflector, an incidence position instead of a reflection position of the incident light is set so as to achieve optimal yields of the incident light for the production of power.

A hydraulic drive unit 21 is provided to control the reflectors 16. This electrically operated hydraulic drive unit 21 comprises a pump assembly 22, which is connected to a hydraulic store 23. Connecting lines 24 to hydraulic lifting cylinders 25, 26 of an azimuth drive 34, which is illustrated in greater detail in FIG. 3, and to a hydraulic lifting cylinder 27 of an elevation drive 35 run from this hydraulic store 23. The hydraulic store 23 or the pump assembly 22 can supply hydraulic fluid to all devices 11 or heliostats or photovoltaic devices of such a field. Alternatively, individual groups of devices 11 can also be supplied by the hydraulic store. When supplying individual groups of devices 11, the hydraulic connecting lines 24 are preferably laid underground and are guided inside the stand 12 of the device 11.

Figure 3:
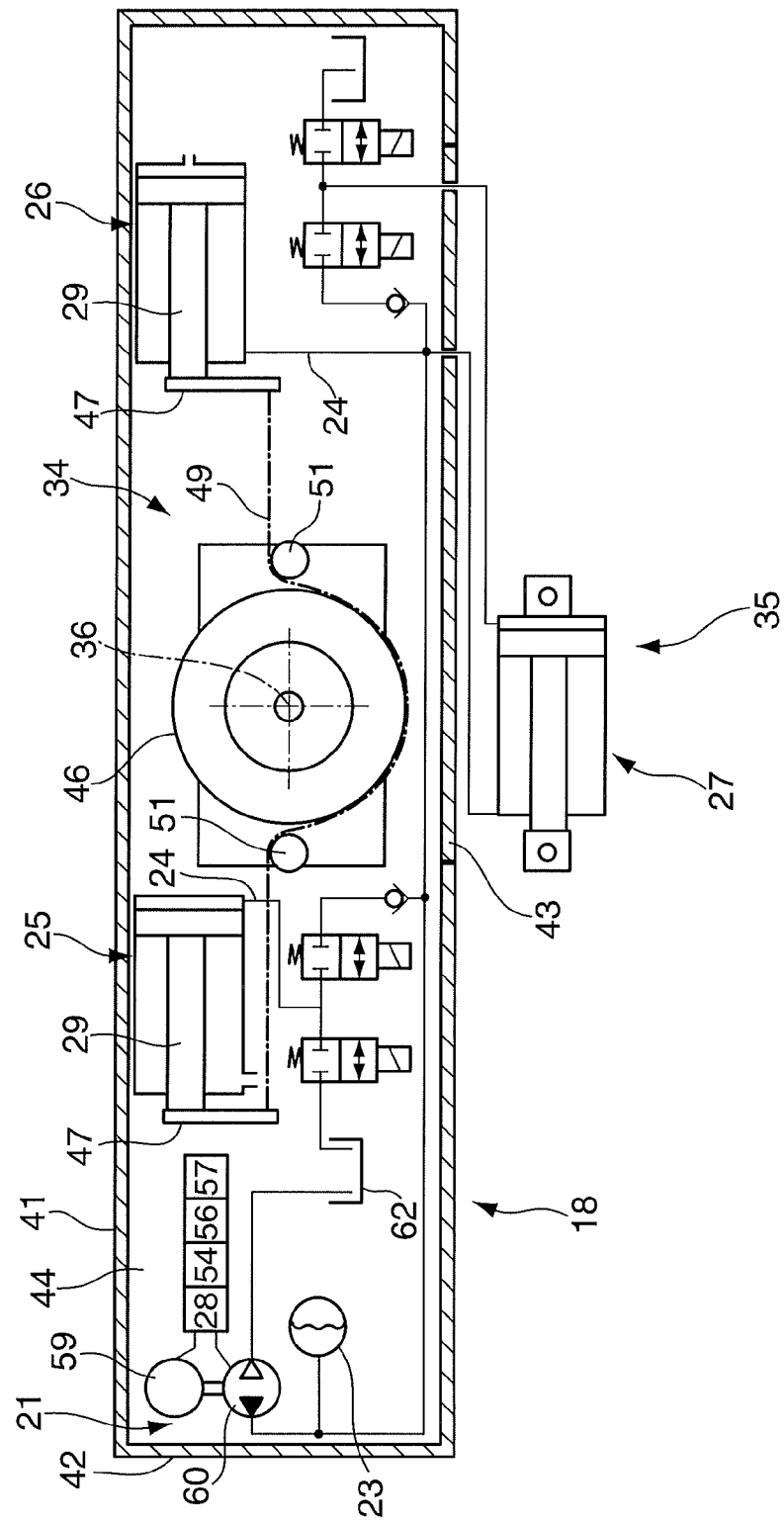
FIG. 3 shows a schematic sectional view of a rotary beam of the carrier device.

A schematic sectional illustration of the rotary beam 18 according to FIG. 2 is illustrated in plan view in FIG. 3.

The rotary beam 18 is U-shaped or box-shaped and comprises a housing 41, which for example is closed by end-face covers 42, which preferably can be removed. A removable wall element 43 is provided on the front side of the housing 41, as a result of which an interior 44 of the housing 41 is accessible.

In this embodiment, at least the azimuth drive 34 is integrated in the housing 41. The azimuth drive 34 comprises two hydraulic lifting cylinders 25, 26, which are arranged in succession and have the same orientation. A transmission 45 having a driving wheel 46, in particular a sprocket wheel, of which the central axis is arranged in the azimuth axis 36, is provided between the hydraulic lifting cylinder 25 arranged to the left of the azimuth axis 36 and referred to hereinafter as the "front lifting cylinder" and the hydraulic lifting cylinder 26 arranged to the right and referred to hereinafter as the "rear lifting cylinder". Each hydraulic lifting cylinder 25, 26 has a piston rod 29, at the free end of which a fastening element 47 is provided. A drive element 49, in particular a drive chain, which rests against and is guided along the driving wheel 46, is fastened to each of these fastening elements 47. Deflection rolls 51, which are used to loop, in part, the drive element 49 around the driving wheel 46 in a secured manner, are preferably provided beside the driving wheel 46. Alternatively to the drive element 49, a toothed belt, friction belt, or the like can also be provided. Alternatively, a connecting rod or rack may equally also be arranged between the fastening element 47.

The front lifting cylinder 25 is supplied by a connecting line 24, which discharges into a cylinder chamber so that the piston area arranged therein of the piston is pressurised. The further connecting line 24 discharges into the rear hydraulic lifting cylinder 26 in a region so that a piston rod area is pressurised. The two hydraulic lifting cylinders 25, 26 are preferably structurally identical. In both lifting cylinders 25, 26, the piston area is thus twice the size of the piston rod area.

A hydraulic drive controller 28 and an electric drive controller 54 are also provided in the housing 41 of the rotary beam 18. The hydraulic drive controller 28 opens and closes the valves, in particular solenoid valves, to control the hydraulic lifting cylinders 25, 26. Furthermore, the hydraulic drive controller 28 controls a motor 59, which is preferably designed as a direct current motor. This direct current motor can be supplied with power selectively by a line fed from the outside or by an accumulator 56 or by a photovoltaic element mounted on the heliostat or by a combination of all sources. The electric drive controller detects signals, for example from a pulse generator 30, which is arranged for example at the end of the rotary beam 18 and detects the angular position of the support frame 17, so as to detect the elevation position. Furthermore, a sensor (not illustrated in greater detail) may be provided in the rotary beam 18, said sensor detecting the azimuth position of the carrier device 14.

An accumulator 56 is also preferably provided in the rotary beam 18 and enables emergency operation so that, in case of power failure, the carrier device 14 can be transferred from the use position illustrated in FIG. 2 into an idle position according to FIG. 1. In addition, this device 11 designed as a heliostat may also have photovoltaic modules, whereby the accumulator 56 is charged. In addition, a controller 57 is provided for emergency operation.

The lifting cylinder 27 is arranged on the wall element 43 of the housing 41 of the rotary beam 18, the piston rod 32 of said lifting cylinder engaging with the support frame 17 so as to pivot the frame 17 about the elevation axis 37. This hydraulic lifting cylinder 27 is preferably designed as a double pressurised lifting cylinder 27. The hydraulic connecting lines 24 are preferably guided into the rotary beam 18 via the wall element 43 or via an opening in the base of the housing 41.

The rotary beam 18 is mounted pivotally on the stand 12 by a hollow bearing axis. The driving wheel 46 having a hollow axis of rotation is fastened to the rotary beam in the extension of this hollow bearing axis and is assigned the axis of rotation 19. Roller bearings or rolling bearings, in particular sliding bearings however, are provided between the rotary beam 18 and the stand 12. This is based on the fact that the rotary beam 18 protects the pivot bearing 19 or that a cover is provided on the housing 41 so that the pivot bearing 19 is not externally accessible.

Due to this arrangement, the hydraulic drive device 28, the electric drive device 54, and the azimuth drive 34 consisting of the hydraulic lifting cylinders 25, 26 and the transmission 45 having the drive element 49 and the driving wheel 46 can be arranged in the interior 44 of the rotary beam 18 and are protected outwardly. In addition, the accumulator 56 and a controller 57 for emergency operation can be provided in the rotary beam. In addition, both the pump assembly 22 described with reference to FIG. 1 and a hydraulic store 23 can be arranged in the rotary beam. In addition, a tank 62 can also be arranged in the rotary beam 18 so that all components for driving the reflector 16 are arranged in the rotary beam 18. The pump assembly 22 arranged in the rotary beam 18 is preferably a mini pump, which supplies a hydraulic pressure and a volume in the range of cubic centimeters per minute, since the demand for the tracking of the reflector 16 is very low. The hydraulic store 23 is preferably a maintenance-free spring store, which is designed in such a way that it can supply at least a hundred tracking operations of the reflector 16 before the pump assembly 22 re-fills it within a short period of time. In case of a power failure, it has to be able to bring the inclination of the reflector into a neutral position so as to quit the focus securely. The tank 62 is preferably designed as a closed oil tank. An internal electric and hydraulic supply can be enabled by the central feed-through of the connecting lines 24 and electric connecting lines (not illustrated in greater detail). The hydraulic drive controller 28 and electric drive controller 54 are preferably provided with plug-in connectors so that the rotary beam 18, in particular together with the elevation drive 35 arranged thereon, can be assembled as a unit, subjected to functional testing, and then supplied as a unit.

The azimuth drive 34 in the rotary beam 18 functions as follows: To induce a rotary motion about the azimuth axis 36, a service pressure is applied to the front lifting cylinder 25. The hydraulic pressure acts on the piston area, whereby the front cylinder 25 functions in a pressing manner. The cylinder pulls on the drive element 49 and induces the rotary motion of the rotary beam 18 via the driving wheel 46 arranged rigidly on the rotary beam 18, since the rear lifting cylinder 26 is pressurised in a pulling manner. This is based on the fact that the piston rod area, which is half the size of the piston area of the front lifting cylinder 25, is effective and therefore counteracts the working force of the front cylinder 25 only at half force. This makes it possible for the drive element 49 to be constantly tensioned. Play-free movement of the carrier device 14 is thus controlled. Play-free drive is thus enabled in a cost effective manner, also enabling precise positioning in very small angular steps due to the hydraulic control and being controllable through a range of angular rotation of 360°.

Figure 4:
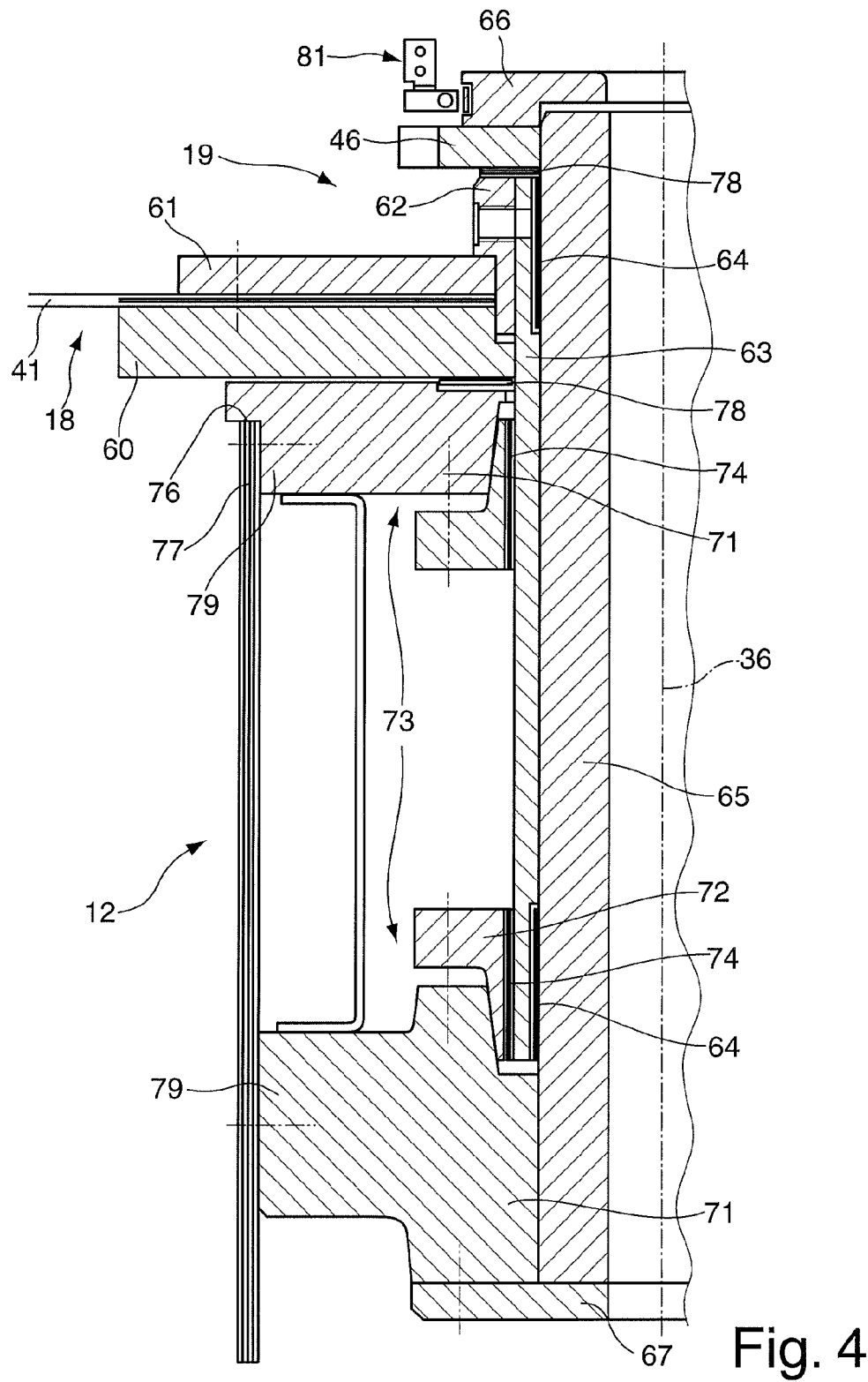
FIG. 4 shows a schematic sectional view of a pivot bearing.

A schematic sectional illustration of the pivot bearing 19 is illustrated in FIG. 4. The stand 12 receives a pivot bearing 19 inserted therein, said pivot bearing being connected to the housing 41 of the rotary beam 18.

This arrangement affords the advantage, as will be described hereinafter in greater detail, that the pivot bearing 19 is pre-assembled on the housing 41 and then only still has to be inserted and fixed in the stand 12 or the pylon pipe, without the need for further adjustments. A ready-assembled module is this supplied.

For reception of the pivot bearing 19 and take-up of the rotary forces to be introduced, the pivot bearing 19 has a bearing plate 60, which cooperates, with interpositioning of a wall of the housing 41, with a base plate 61 and tensions the wall of the housing 41 arranged in between. An annular collar 62 rests against the base plate 61 and is preferably connected rigidly to a support pipe 63 via a screwed connection. This support pipe 63 has a radial sliding bearing 64 at the upper end and at the lower end, whereby this support pipe 63 receives a hollow shaft 65 pivotally. The driving wheel 46, which is designed in the form of a gearwheel, is fastened at the upper end of the hollow shaft 65 in a play-free and rotationally engaged manner. To secure the driving wheel 46, a bearing closure 66 is provided. At the opposite end of the hollow shaft 65, a bearing cover 67 is provided, which carries a base bearing 71. This base bearing 71, together with a gauge ring 72, forms a radial insert ball bearing 73, whereby a radial play-free adjustment between the base bearing 71 and the hollow shaft 65 is enabled due to the respective clamping cone. The gauge ring 72 is preferably arranged relative to the support pipe 63 via a further sliding bearing element 74. So that a radial play-free adjustment is enabled at the upper and lower end of the hollow shaft 65, a further radial insert ball bearing 73, which likewise consists of a base bearing 71 and a gauge ring 72, engages with the upper end of the hollow shaft 65. The upper base bearing 71 additionally has a shoulder 76, via which the entire pivot bearing 19 is supported on the stand 12. A peripheral wall 77 of the base bearing 71 connected to said stand engages flushly with an inner wall of the stand 12. The peripheral wall 71 of the lower radial insert ball bearing 73 also engages in the inner wall of the stand 12.

For example, fastening elements 79, which are preferably designed as fastening screws which each engage with the base bearing 71 and fix it to the stand 12, are provided for simple fastening of the pivot bearing 19 on the stand 12. These fastening elements are used at least to secure the stand 12 against rotation.

To axially support the hollow shaft 65, an axial bearing 78 is located between the upper base bearing 71 and the bearing plate 60 and is likewise designed as a thrust bearing. Such a thrust bearing is likewise formed between the driving wheel 46 and the annular collar 62 or the support pipe 63.

This embodiment of the pivot bearing 19 enables complete assembly of the pivot bearing on the housing 41 of the rotary beam 18 and, at the same time, biasing of the radial insert ball bearing 73 before insertion of the pivot bearing in the stand 12 for play-free adjustment in the vertical axis of rotation 36. The rotary beam and therefore the reflectors can thus be received in a highly precise manner.

In addition, the bearing closure 66 may be assigned a sensor 81, which is arranged rigidly on the rotary beam 18 and is thus pivoted together with the rotary beam, detects and compares the rotary position of the rotary beam 18 relative to the stand 12, and forwards this information to a controller. In the illustrated arrangement, the bearing plate 60 and the base plate 61 as well as the housing 41 mounted in between and the annular collar 62 and the support pipe 63 are formed as turning or rotating parts in the case of this pivot bearing 19. These parts are guided to the further fixed parts via sliding bearing elements.

Electric and hydraulic lines within the stand 12 in the rotary beam 18 can be led within the pipe 65 along the axis of rotation 36 in a protected manner.

Figure 5:
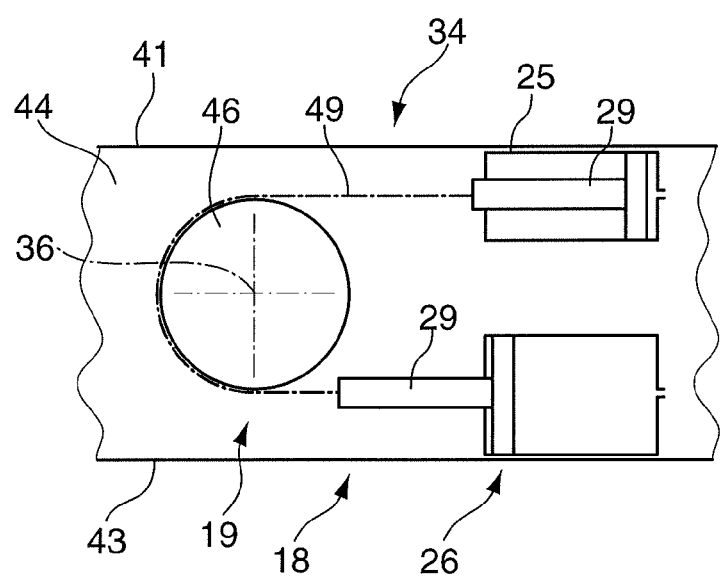
FIG. 5 shows a schematic illustration of an alternative arrangement of the lifting cylinder in the rotary beam.

An alternative arrangement of the lifting cylinders 25, 26 in the rotary beam 18 is illustrated in FIG. 5. In this embodiment, the piston rod area of the lifting cylinder 26 is preferably twice the size of that of the lifting cylinder 25. Pressure is applied constantly to the cylinder 25 and said cylinder thus pulls on the drive chain 49. The lifting cylinder 26 likewise pulls on the drive chain 49 so that said chain is always tensioned. Pressure is additionally applied to the lifting cylinder 25 or 26 according to the direction of rotation.

Both above-mentioned embodiments for controlling an adjustment motion of the rotary beam 18 further afford the advantage that, if the wind load is too high, at least one overpressure valve or control valve provided in the hydraulic drive controller 28 opens automatically so that the reflector 16 can yield to the wind load, turn out of the wind, and can adopt a position which produces a lower load on the reflector 16. Depending on the position of the reflector 16, a tensile force for example may stress the cylinder 25 via the drive chain 49. This causes a rise in pressure, which opens the overpressure valve (not illustrated in greater detail) assigned to the piston chamber of the cylinder 25 so that the hydraulic medium can flow out from the piston chamber of the hydraulic cylinder 25, for example into a tank 62. The drive chain 49 remains tensioned, since the piston rod chamber of the hydraulic cylinder 26 is pressurised. If, by contrast, the tensile force acts on the hydraulic cylinder 26, a large overpressure valve, which again is not illustrated in greater detail, thus opens again as the pressure rises. The hydraulic fluid thus flows out from the piston chamber of the hydraulic cylinder 26, together with the hydraulic fluid from the store 23 or the pump 22, into the piston chamber of the hydraulic cylinder 25. The described processes last until the reflectors 11 have moved under the pressure of the wind into a neutral position. If the pressure falls, a control valve, which had opened under the pressure acting on the cylinder 26, returns to a starting position. If the wind wanes, the electronic drive controller 54 moves the reflectors 16 back into their effective position.

This method of control of the reflector 16 by hydraulic lifting cylinders 25, 26 further affords the advantage that a substantially quicker adjustment is enabled compared to previous drive options. This means that a neutral position of the reflector 16 can be adopted in less than a minute for example, whereas this process required 10 to 20 minutes in the previous electric motor drives having control gears. This means that, even in the event of a gale warning, a focussing position of the reflector 16 can be retained until just before the gale-force winds arrive, thus enabling a longer period for energy production.

The invention claimed is:

1. A device for receiving at least one reflector or at least one photovoltaic module, comprising:
    a stand,
    a carrier device arranged on the stand, said carrier device being mounted on the stand rotatably about an azimuth axis and having a rotary beam, on which a support frame for receiving the at least one reflector or the at least one photovoltaic module is pivotally arranged so that the support frame is pivotable about an elevation axis, a hydraulic drive control, which controls a first and a second hydraulic lifting cylinder to induce rotary motion of the rotary beam about the azimuth axis and a third hydraulic lifting cylinder to induce pivotal motion of the support frame about the elevation axis, and at least one azimuth drive including the first and second hydraulic lifting cylinders that control the rotary motion of the rotary beam and that are arranged in an interior of the rotary beam.

2. A device according to claim 1, wherein the azimuth drive has a transmission, which is provided in the region of a pivot bearing between the rotary beam and the stand, and is covered by the rotary beam.

3. A device according to claim 2, wherein the rotary beam is arranged rotatably on the stand by means of a pivot bearing, and a pivot bearing axis is formed by a hollow shaft having a central passage for hydraulic and/or electric connecting lines.

4. A device according to claim 3, wherein the transmission has at least one driving wheel having a hollow axis of rotation, said driving wheel being fastened to the pivot bearing.

5. A device according to claim 3, wherein the pivot bearing is pre-assembled on the rotary beam.

6. A device according to claim 5, wherein the rotary beam can be inserted in the stand together with the pre-assembled pivot bearing and can be fixed by at least one fastening element.

7. A device according to claim 5, wherein the pivot bearing has at least one radial insert ball bearing for play-free adjustment and is biased for assembly on the stand.

8. A device according to claim 3, wherein the first and second hydraulic lifting cylinders are arranged in the rotary beam, an extending motion induced by respective piston rods of the first and second hydraulic lifting cylinders being oriented identically, and one of the first and second hydraulic lifting cylinders arranged to the left of the azimuth axis forming a front cylinder and the other of the first and second hydraulic lifting cylinders arranged to the right of the azimuth axis forming a rear cylinder, and in that the ends of the respective piston rods of the front and rear hydraulic lifting cylinders are connected in each case to an end of a drive chain, which engages with a driving wheel arranged rigidly on the rotary beam and forms the transmission.

9. A device according to claim 8, wherein the transmission has a drive chain as a drive element, said drive chain engaging peripherally, at least in part, with the driving wheel designed as a gearwheel.

10. A device according to claim 8, wherein, to induce a rotary motion of the rotary beam, the front lifting cylinder operates in a pressing manner during the extending motion of the respective piston rod when pressure is applied to a piston area of the front lifting cylinder, and the rear lifting cylinder operates in a pulling manner when a pressure is applied to a piston rod area of the rear lifting cylinder.

11. A device according to claim 8, wherein the front and rear lifting cylinders are formed identically.

12. A device according to claim 8, wherein deflection rolls are assigned to the driving wheel.

13. A device according to claim 1, wherein the hydraulic drive control and/or an electric drive controller and/or an accumulator and/or a controller, which is connected to the accumulator for emergency operation, and/or a pump assembly and/or a pump store, is arranged in the rotary beam.

14. A device according to claim 1, wherein the rotary beam has a housing, which is U-shaped or box-shaped and comprises at least one removable wall element.

15. A device according to claim 14, wherein an elevation drive, which comprises the third hydraulic lifting cylinder, is arranged on the removable wall element.

16. A device according to claim 1, wherein the rotary beam with the hydraulic drive control, an electric drive controller, the hydraulic lifting cylinders, and a transmission of an elevation drive are formed as a functional unit and are connected to the rotary beam.

17. A device according to claim 16, wherein the hydraulic drive control, the electric drive controller, the hydraulic lifting cylinders, and the transmission have pluggable electric and/or hydraulic connectors on connecting lines.

* * * * *